United States Patent [19]

Crew

[11] 4,065,961

[45] Jan. 3, 1978

[54] ENGINE ACTUATED INSTRUMENTATION AND A FUEL SAVING AND DIAGNOSTIC SYSTEM BASED THEREON

[75] Inventor: Robert T. Crew, Jacksonville, Fla.

[73] Assignee: C & E Enterprises, Inc., Jacksonville, Fla.

[21] Appl. No.: 758,489

[22] Filed: Jan. 11, 1977

[51] Int. Cl.[2] .......... G01M 15/00

[52] U.S. Cl. .......... 73/117.3; 340/60

[58] Field of Search .......... 73/116, 115, 117.3; 340/60

[56] References Cited

U.S. PATENT DOCUMENTS

| | | | |
|---|---|---|---|
| 2,692,980 | 10/1954 | Platt | 73/117.3 UX |
| 2,870,753 | 1/1959 | Shuck et al. | 340/60 X |
| 3,032,264 | 5/1962 | Neely | 73/116 UX |
| 3,379,056 | 4/1968 | Ellison | 73/115 |

*Primary Examiner*—Jerry W. Myracle

*Attorney, Agent, or Firm*—George H. Baldwin; Arthur G. Yeager

[57] ABSTRACT

This system relies upon certain visual indicating and recording instrumentation which connect with an internal combustion engine and sense and record engine variables, including starts and loads. Visual indicating of these instruments by the operator of a motor vehicle so equipped encourage operation thereof in an economical manner. The recorded indications, when compared with each other give FER, a number indicating (Fuel Efficiency Ratio) which is a unique measurement of fuel efficiency and a tool to simplify diagnosis and cure of those instances of low miles per gallon of fuel.

10 Claims, 5 Drawing Figures

ENGINE ACTUATED INSTRUMENTATION AND A FUEL SAVING AND DIAGNOSTIC SYSTEM BASED THEREON

SUMMARY p Any motor vehicle whether powered by gasoline, such as the ordinary spark ignition engine, or, by fuel oil, such as a Diesel engine, can be operated and maintained in a manner either to achieve good fuel economy and long engine life or, poor fuel economy and less engine life. A universally accepted truism is that a well maintained engine operated with conservative and moderate acceleration technique and steady throttle, as opposed to sudden accelerations at full throttle and poor maintenance, produce optimum fuel efficiency. Engine over-accelerations followed by frequent braking, long periods of engine idle, and engine operation at high loads, such as occur during over-accelerations should be avoided as causes of excessive gasoline consumption.

This system will be explained as it is applied to a spark ignition, gasoline fueled engine when used as a power source for a motor vehicle. It will be readily appreciated by those skilled in the art of engines that, with some modification of instrumentation, the same system is adaptable to a Diesel engine powered vehicle. With a Diesel engine load can be sensed by throttle opening or by exhaust gas temperature.

EXEMPLARY INSTRUMENTS FOR SYSTEM USE

One indication of load in a gasoline fueled spark ignition engine is manifold pressure i.e. (manifold vacuum) or MP. This system, at present, used a device known as "Accelerite" manufactured by Tomco Inc. of St. Louis, Mo. The "Accelerite" is an audio-visual vacuum gauge with a piston exposed to MP and a plunger movable with the piston carrying indications. To this gauge is added a mechanical, non-reset totalizer which is activated by the extreme movements of the linear indicator plunger of the "Accelerite" so as to record each instance of over-acceleration. These instances are accompanied by MP dropping to or below the 6 inch range, as measured in inches of mercury. At this vacuum, activation of the carburetor power system occurs to give the necessary rich mixture for proper engine operaion.

Because the above described gauge-counter will not only count the number of fuel wasting over-accelerations, but also the number of vacuum drops associated with engine stops, a second instrument is provided. This second instrument is a 12 volt engine-start totalizer. This counts and records only engine starts which are referenced to the counter by an impulse of electricity from either the engine starter switch to starter solenoid lead or, from the oil pressure sensing switch.

Subtraction of the number of starts recorded from the number of vacuum drops recorded gives a number indicating over-accelerations.

By dividing the total vacuum drops recorded on the gauge counter by the number of engine starts recorded by the start counter a Fuel Efficiency Ratio (FER is obtained). A perfect FER therefore would be one vacuum drop recorded per engine start evidencing conservative operating technique and proper engine maintenance.

PRESENT AVAILABLE PERFORMANCE DATA

Many, if not most owners and fleet operators have only a record for fuel cost for each vehicle for a given accounting period. With this information alone to work with, it is possible through manual computation or by computer print out to detect the apparent presence of a low MPG vehicle in a given accounting period. There is the possibility, however, that the timing of gas tank fillups to the duration of this period could indicate higher or lower than actual fuel consumption.

One example would be the vehicle that was fueled on the first and last days of the period. The computation would reflect the consumption of an entire tank of fuel that had not yet been consumed. This would artificially indicate low MPG. The owner or manager, knowing that an apparent instance of low MPG might be artificially induced by the vagaries of tank fillups, often waits for a subsequent accounting period to verify the low MPG condition thereby extending the duration of fuel waste, if in fact the first detection was correct and the vehicle was in fact getting low MPG.

Conversely, in the event the vehicle is fueled the day before and the day after an accounting period, the MPG of that vehicle is erroneously detected as high or good, while, in fact, the vehicle might actually be low MPG, thus extending the duration of excessive fuel consumption through subsequent accounting periods.

These examples reflect the inaccuracies and unreliability of any MPG number computed over a given accounting period.

The most reasonable solution to present practice is this new system introducing a new performance number FER which when compared with MPG perfects the timely detection and verification of any number obtained from a calculation of MPG and especially low MPG of any vehicle.

Besides aiding in detection and verification, this new system, and number, expedite diagnosis and cure of instances of low MPG, such as:

1. poor driving technique;
2. vehicle maintenance necessary;
3. fuel pilferage;
4. excessive idling; and,
5. any combination of the above.

MANAGER OR OWNER USE OF SYSTEM

This new number can detect and verify low MPG. If a vehicle is reported with good MPG but has a poor or high FER then it was probably one of the vehicles which may have been fueled the day before or the day after an accounting period.

If a vehicle shows low MPG and a low FER is was probably one of those vehicles fueled on the last day of the accounting period.

1. Instances of low MPG reported for an accounting period together with a high number FER relative to previous numbers reported for that vehicle and current numbers for similar vehicles indicate poor driving technique if the vehicle has been recently tuned-up.

2. If the particular vehicle has not been tuned-up recently then maintenance is indicated.

3. Fuel pilferage is determinable whenever management detects low MPG and good FER and engine start count is in line with scheduled stops or in accordance with the norms for vehicle usage.

4. Excessive idling is determinable when management detects low MPG, good FER and fewer start counts than the usual number of authorized stops, or in accordance with the norms for the particular vehicle usage.

5. If the first four of the above conditions have been corrected of course any combinations thereof have been corrected.

DRIVER OR OWNER USE

Upon installation of this system it is explained as a preventive maintenance system, which will signal onset of out-of-tune condition in the form of vacuum drops or violations during routine driving. It is explained that significantly more throttle is required by an engine out-of-tune than one properly tuned up to obtain the same power. The drivers are instructed to report immediately the probable need for repair in order to stop waste of fuel from continuing until it would otherwise be detected, possibly several weeks later, through reporting channels.

It is pointed out that the only other reason for accumulation of vacuum drops or violations is frequent and excessive throttle. Knowing that he is fully accountable for both major causes of fuel waste, he will be inclined to obey the audible signal and visual signals of the vacuum gauge. This will prevent or cure most all instances of fuel waste before they enter the fleet reporting process. Hence, low MPG problems indicated as (1) and (2) above are usually prevented or cured before management ever becomes aware of them. Those instances of low MPG that escape prior prevention on the driver's part or cure and do enter the fleet reporting system are now fewer and again more easily diagnosed and cured.

A driver cannot blame faulty repair for poor FER unless it is actually faulty repair because management can immediately reassign the driver in question to another vehicle and quickly and easily determine whether the poor FER follows the driver or the vehicle. Further, drivers will insist on precision maintenance performance, since improper maintenance will be immediately detected by the driver who finds vacuum drop counts (Violations) still being accumulated on an improperly tuned vehicle. Vehicles re-reported for maintenance will reveal the source of improper repair. A vehicle erroneously re-reported for maintenance will be reported to management by maintenance personnel thus further identifying improper drivng technique as the cause of the fuel waste.

DETAILED DESCRIPTION OF INSTRUMENTATION

Figure 1:
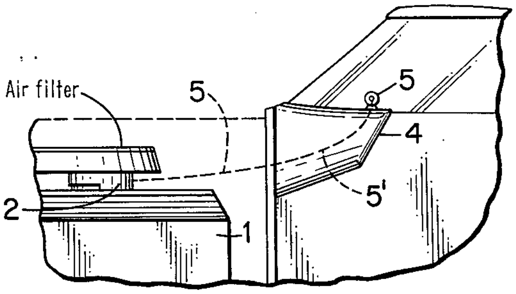
FIG. 1 is a schematic side view illustrating the mounting of the load indicating and recording vacuum gauge and its connection to the vehicle and engine.

In FIG. 1 there is shown an engine 1 in part of a vehicle body. On engine 1 is a carburetor 2 beneath the air filter. The vacuum line 51 is connected to a vacuum source of MP (not shown) such as the choke pull off motor for the carburetor 1.

Figure 2:
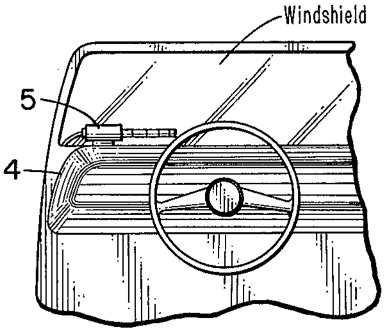
FIG. 2 is a view similar to FIG. 1 showing the location of this gauge with respect to vehicle and driver.

In FIGS. 1 and 2 is shown one location of the vacuum indicating gauge 5 on the instrument panel 4 of the vehicle. It is within the peripheral vision of the driver.

Figure 3:
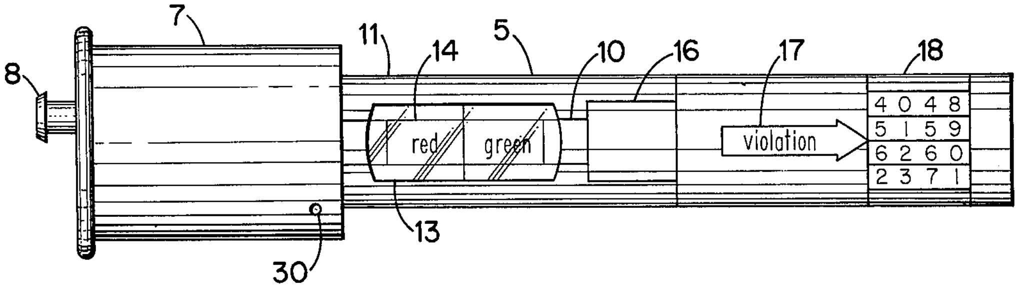
FIG. 3 is a schematic illustration of the combined gauge and recorder on a large scale.

FIG. 3 shows the gauge 5 in greater detail. There is a vacuum connection 8 for line 51 on cylinder 7 which contains a diaphragm (not shown) urged to the right by a spring (not shown) of suitable calibration. This diaphragm carries a plunger 10 enclosed by casing 11 of clear plastic having a window 13 with an index pointer 14.

Plunger 10 abuts a second plunger 16 which when forced to the right will cause one count to be recorded by the register 18. Every time there is a vacuum drop due to increased load, the plunger 10 is forced to the right by the afore-mentioned spring. This causes one count to be registered by 18. The counter is a non-reset type.

Figure 4:
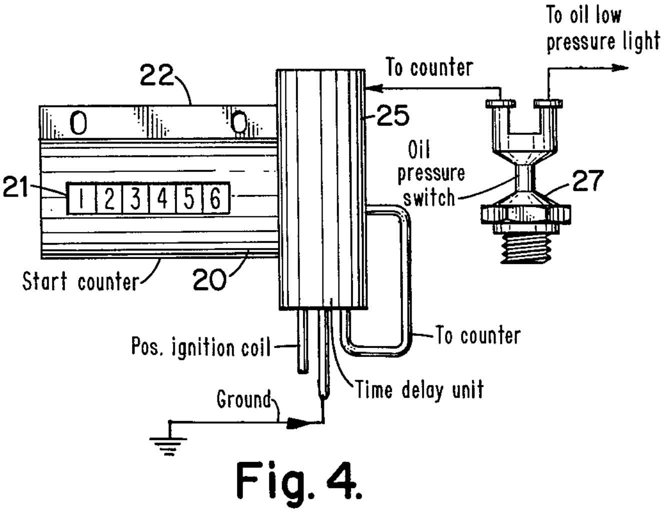
FIG. 4 is a schematic illustration of the engine start totalizer.

The start counter 20 in FIG. 4 has a non-reset register 21 and a mounting bracket 22. Various connectors lead to the positive terminal of the ignition coil and to ground, as indicated in the drawings, so that as soon as the engine is cranked the register will be energized to record one start.

If desired the starter counter 20 may be provided with a time delay unit 25. This time delay unit has a connection to the low oil pressure switch 27. In other words, when the engine is stopped and there is no oil pressure, switch 27 is closed to ground and operation of the ignition key to start the engine has no effect upon the totalizer 20 because it is grounded out. After the engine is started, oil pressure builds up in a minute or two to open switch 27. The counter is then energized to actuate the register for one count. This alternative construction will prevent the driver from "bumping" the starter several times to bring up his start count to show a better than actual FER read out.

Figure 5:
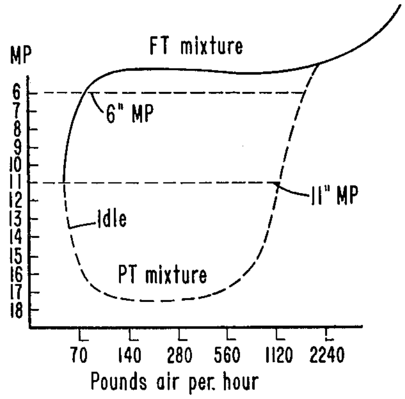
FIG. 5 is a schematic illustration of the difference between the mixture ratio at part throttle, indicated as PT and the mixture ratio at full throttle indicated as FT. These ratios are simulated or approximate since they vary from engine to engine.

Turning now to FIG. 5 which is a simulated plot of fuel mixture ratios with respect to two variables, MP in inches of mercury shown vertically, and pounds of air per hour, horizontally. The full throttle curve FT is a solid line. The part throttle curve PT is dotted. These curves indicate graphically that operation on the leaner mixtures on the PT curve is more economical. This is especially true in the range of MP greater than 11 to 12, that is from 11 or 12 to 17 or greater.

Accordingly, the gauge 5 is calibrated so that an MP of 11 or 12 or greater it indicates green on plunger 10 through window 13. Below 11 or 12 plunger 10 indicates red.

Accordingly, the gauge 5 is calibrated so that at MP of 12 an audible chirping sound is emitted. This sound is produced by means of excess tolerance or slack between fitting connecting pin attaching the vacuum diaphragm rod to the indicator plunger. This audibility may be intensified by placing one or more holes 30 in the atmosphere pressure side of the diaphragms metal housing, thereby allowing the inherent internal movement sounds of the diaphragm to escape into the driver compartment. This audibility is a necessary part of the system for at least two reasons: Visual only indicators or signals are often unperceived by vehicle operators whose visual acuity must be totally attuned to the traffic scene to ensure safe vehicle operation. Also, because the intent of the system is to prevent fuel waste from occurring, the audible signal is calibrated to occur at the onset of excessive throttle pressure so as to prevent the fuel waste from first occuring by affording the operator a timely signal of impending waste.

Beginning at an MP of 11, the two colored indicator piston begins its travel toward the counter activating mechanism. This travel is accompanied by color change as well as the movement of ths indicator piston which appeals to the peripheral rather than direct vision of the driver so as not to compete with the traffic scene for the direct visual attention of the operator. If both the audible and visual warnings of impending and actual waste are disregarded and throttle pressure increases to the point where an MP of 6 is reached, the register counts one instance of over acceleration, (or one instance of increased load) indicative of fuel waste.

CONCLUSION

This system, to be known as VacTach (Visual Automotive Cost Tracking and Control Hardware) is easily understood, easily installed and easily re-installed on replacement vehicles with no damage to either. FER, the unique new measurement of fuel efficiency, is easily determinable at any time, with no need to fill the gas tank for the calculation. This permits daily, weekly, monthly or random checks of fuel efficiency by driver and/or vehicle. Calculating MPG in motor pool environments is not economically feasible where several drivers may operate a given vehicle during one day, thereby necessitating several extremely accurate fill-ups per day to determine proper or improper operating techniques through calculations of MPG. FER allows for the easy determination of individual driving technique no matter how many drivers operate the same vehicle in any given time period. The system is equally applicable to manual or computerized data collection, processing and comparative analysis. Through providing vehicle owners with total driver accountability in the prevention and cure of both fuel wasting operating techniques and fuel wasting mechanical mal-functions, both major causes of excessive fuel consumption are prevented or cured in a timely manner saving many dollars in fuel and maintenance, aiding energy conservation, and extending vehicle life. Fuel Efficiency Ratio, FER is not possible without the VacTach instrumentation. Additional energy conservation and fuel cost savings will occur indirectly as a result of the systems use in fleets. Employee/drivers, having acquired less wasteful driving techniques in employer equipped vehicles, will carry these habits over, to personally owned vehicles thereby conserving additional energy.

I claim:

1. In a system for automotive fuel cost tracking and engine diagnostic determination, a visual indicating means and a first recording register having means to connect with an engine and other means to mount the same within the view of the driver, said indicating means being movable from a position showing imminent, and then actual departure of the engine from a lean part throttle mixture to a rich full throttle mixture as the throttle is opened and the load on the engine is increased to a degree wasting fuel, and, for counting each occurrence of such throttle operation, and a second recording register with means connecting with the engine to record each engine start, said system including the step of determining accountability for poor miles per gallon by comparing the count on the first said register with the count on said second register.

2. In a system as defined in claim 1 wherein the step of comparing is subtraction of the count on the said second register from the count on said first register.

3. In a system as defined in claim 2 wherein the system includes a further step of keeping a continuous running record of the comparison obtained by said first step by recording the numbers obtained in said first step at certain or random periods of time.

4. In a system as defined in claim 2 wherein said first register is a manifold pressure gauge and the means the retrofit with an engine is a tube connecting said gauge with a source of manifold pressure thereon, and wherein said second register includes a means to delay registering a count of a start until after the engine is running on its own power.

5. In a system as defined in claim 4 wherein said manifold pressure gauge operates and visual indicating means and said visual indicating means is combined with an audible signal means and means mounting said visual indicating means within sight and hearing of an operator.

6. In a system as defined in claim 1 wherein the step of comparing is division of the count on said first register by the count on said second register thereby to obtain a number indicating fuel efficiency ratio (FER).

7. In a system as defined in claim 6 wherein the system includes a further step of keeping a continuous running record of the comparison obtained by said first step by recording the numbers obtained in said first step at certain or random periods of time.

8. In a system as defined in claim 6 wherein the system includes the further step of comprising MPG with FER.

9. In a system as defined in claim 1 wherein said first register is a manifold pressure gauge and the means to retrofit with an engine is a tube connecting said gauge with a source of manifold pressure thereon, and wherein said second register includes means to delay registering of a count of a start until after the engine is running on its own power.

10. In a system as defined in claim 9 wherein said manifold pressure gauge operates said visual indicating means and said visual indicating means is combined with an audible signal means and means mounting said indicating means within sight and hearing of an operator.

* * * * *